United States Patent [19]

Holy et al.

[11] Patent Number: 5,268,437
[45] Date of Patent: Dec. 7, 1993

[54] HIGH TEMPERATURE AQUEOUS POLYMERIZATION PROCESS

[75] Inventors: Norman L. Holy, Penns Park; Newman M. Bortnick, Oreland; Graham Swift; Kathleen A. Hughes, both of Blue Bell, all of Pa.

[73] Assignee: Rohm and Haas Company, Philadelphia, Pa.

[21] Appl. No.: 823,733

[22] Filed: Jan. 22, 1992

[51] Int. Cl.$^5$ .................. C08F 4/30; C08F 2/16; C08F 20/04
[52] U.S. Cl. .................. 526/229; 526/230; 526/227; 526/271; 526/312; 526/318.2; 526/317.1; 526/318.4; 526/318.42; 526/307.6; 526/287; 526/278; 526/264; 526/259
[58] Field of Search .............. 526/317.1, 382, 271, 526/240, 229

[56] References Cited

U.S. PATENT DOCUMENTS

| | | | |
|---|---|---|---|
| 3,379,702 | 4/1968 | Spivey | 526/240 |
| 4,301,266 | 11/1981 | Muenster et al. | 526/212 |
| 4,314,044 | 2/1982 | Hughes et al. | 524/808 |
| 4,414,370 | 11/1983 | Hamielec et al. | 526/88 |
| 4,485,223 | 11/1984 | Walinsky | 526/80 |
| 4,529,787 | 7/1985 | Schmidt et al. | 526/317 |
| 4,546,160 | 10/1985 | Brand et al. | 526/320 |
| 4,774,303 | 9/1988 | Denzinger et al. | 526/212 |
| 4,914,167 | 4/1990 | Hambrecht et al. | 526/65 |
| 5,055,540 | 10/1991 | Hughes et al. | 526/318.2 |

FOREIGN PATENT DOCUMENTS 412389 2/1991 European Pat. Off. .
4003172 8/1991 Fed. Rep. of Germany .

OTHER PUBLICATIONS

Spychaj, et al., High-Temperature Continuous Bulk Copolymerization of Styrene and Acrylic Acid: Thermal Behavior of the Reactants, pp. 2111–2119, Journal of Applied Polymer Science, vol. 42.

*Primary Examiner*—Joseph L. Schofer
*Assistant Examiner*—Mark Nagumo
*Attorney, Agent, or Firm*—David T. Banchik

[57] ABSTRACT

This invention relates to high temperature aqueous processes for the polymerization of monoethylenically unsaturated carboxylic monomers to produce low molecular weight, water-soluble polymer products useful as detergent additives, scale inhibitors, dispersants and crystal growth modifiers. Suitable monomers include acrylic acid, methacrylic acid, maleic acid, maleic anhydride, crotonic acid, and itaconic acid. The reactions are run at temperatures ranging from about 130° C. to 240° C., preferably from about 140° C. to about 230° C. The process can be continuous, semi-continuous, or batch.

15 Claims, No Drawings

HIGH TEMPERATURE AQUEOUS POLYMERIZATION PROCESS

FIELD OF THE INVENTION

This invention relates to processes for the production of low molecular weight carboxylic acid polymers. In particular, this invention relates to high temperature aqueous polymerization processes which yield polymers having number average molecular weights ($M_n$) below about 10,000 and having a polydispersity (ratio of the weight average molecular weight ($M_w$) to the number average molecular weight) of below 2.5.

Low molecular weight carboxylic acid polymers are known to be useful detergent additives, anti-redeposition agents, hard surface cleaners, scale inhibitors, pigment dispersants, water treatment additives and the like. However, production of very low molecular weight polymers of carboxylic monomers, especially acrylic acid, has proven to be a difficult task.

In certain applications, such as detergent additives, it is becoming increasingly important that the carboxylic acid polymers are biodegradable. It is known that biodegradability increases as molecular weight decreases. Therefore, processes which produce very low molecular weight polymers may provide routes to biodegradable polymer products.

In other applications, such as water treatment, it is particularly important that the polymer product have a narrow molecular weight distribution, i.e. low polydispersity. Polydispersity rises rapidly as the high molecular weight fraction of the polymer mixture increases. In many processes designed to produce low molecular weight polymers, high molecular weight fractions are observed because there is insufficient control over chain-chain coupling and branching. These high molecular weight fractions tend to dominate the viscosity characteristics of the polymer product and can detract from polymer performance. Other processes designed to produce low molecular weight polymers result in the formation of excessive amounts of dimers and trimers which can also detract from the polymer performance. These by-products do not have as much of an effect on the viscosity characteristics of the polymer mixture. However, they do affect the number average molecular weight such that it is no longer indicative of the properties of the polymer product.

In addition to chain-chain coupling and branching, processes for producing low molecular weight polymer products tend to have high polydispersities resulting from the methods used to reduce the residual monomer content of the polymer product. Methods of reducing the residual monomer content of the polymer mixture include post-polymerization with additional initiator, extended holds at elevated temperatures and use of comonomeric scavengers. All of these methods will broaden the molecular weight distribution. Therefore, unless the polymer mixture has a sufficiently low polydispersity to begin with, the methods used to reduce residual monomer content will raise polydispersity of the product to an unacceptable level.

The art has long sought an inexpensive, efficient and environmentally sound way to produce low molecular weight polymers having a narrow molecular weight distribution.

One method of achieving low molecular weight polymers is through the use of efficient chain transfer agents, but this approach has several drawbacks. This approach incorporates the structure of the chain transfer agent into the polymer chain. This can be undesirable since that structure will have an increasing effect on the properties of the polymer as molecular weight decreases. Furthermore, the chain transfer agents commonly employed are mercaptans. These materials are expensive and have objectionable odors associated with their presence. Other common chain transfer agents are hypophosphites, bisulfites and alcohols. These also add to the cost of the process, impart functionality to the polymer, can introduce salts into the product, and may necessitate a product separation step.

Another way of lowering the molecular weight of the polymers produced is by increasing the amount of initiator. This approach adds considerably to the cost of production and may result in polymer chain degradation, crosslinking, and high levels of unreacted initiator remaining in the product. In addition, high levels of initiator may also result in high levels of salt by-products in the polymer mixture which is known to be detrimental to performance in many applications. The same is true for chain stopping agents such as sodium metabisulfite. Among the preferred free-radical initiators for aqueous polymerization is hydrogen peroxide. It is relatively inexpensive, has low toxicity, and does not produce detrimental salt by-products. However, hydrogen peroxide does not decompose efficiently at conventional polymerization temperatures and large amounts must be used to generate enough radicals to carry out a polymerization.

High levels of metal ions together with high levels of initiator have also been tried as a means for controlling molecular weight. This method is taught in U.S. Pat. No. 4,314,044 where the ratio of initiator to metal ion is from about 10:1 to about 150:1 and the initiator is present from about 0.5 to about 35 percent based on the total weight of the monomers. Such an approach is unsuitable for some products, such as water treatment polymers, which can not tolerate metal ion contaminants in the polymer product. In addition, the product is usually discolored due to the presence of the metal ions.

One method of producing polymers more economically is to produce them by bulk polymerization processes. However, bulk polymerization of acrylic monomers in the absence of chain transfer agents generally leads to formation of high molecular weight polymers and gels which are not suitable for many applications.

Similarly, an economically advantageous approach to the production of low molecular weight polymers has been by continuous processes. The continuous processes previously known are either bulk processes, or non-aqueous solvent processes. The problem with bulk processes is the loss of control of molecular weight in the absence of efficient chain transfer agents. Non-aqueous solvent processes also have the problem of increased cost due to the raw materials, solvent handling equipment and product separation.

U.S. Pat. No. 4,546,160 to Brand et al. discloses a high temperature continuous bulk process for the polymerization of acrylic monomers. The process allows for up to 25 percent by weight based on the total amount of monomers to be a high boiling solvent, preferably from about 0 to about 15 percent by weight. The solvents have a boiling point above 100° C. and preferably above 150° C. The solvents disclosed include aromatic alcohols, alcohol and glycol ethers, esters and mixed ethers and esters. Other solvents disclosed are aromatic solvents such as toluene, xylene, cumene, and ethyl benzene. In addition, if there is minimal reaction, some glycols may be used such as ethylene, propylene and butylene glycols and their polyether analogs. The preferred solvents are Cellosolve acetate and isoparaffinic hydrocarbons.

In the Journal of Applied Polymer Science, Vol. 42, p 2111–2119 (1991), Spychaj and Hamielec disclose an unsuccessful attempt to continuously polymerize an aqueous solution of acrylic acid at high temperature. The result of their attempts was a mixture of dimers, trimers and tetramers as the major reaction products.

U.S. Pat. No. 4,414,370 to Hamielec et al discloses a high temperature continuous bulk process for the polymerization of styrene with acrylic acid. The process allows for up to 20 percent by weight based on the total monomers to be a high boiling solvent, preferably from about 1 percent to about 10 percent. The solvents disclosed are polyalkoxy monoalkanols such as those derived from 2-ethoxyethanol, like butyl Cellosolve and Cellosolve acetate. A preferred solvent is diethyleneglycol monoethyl ether.

U.S. Pat. No. 4,529,787 to Schmidt et al. discloses a high temperature continuous bulk process for the polymerization of aromatic and acrylic monomers. The process allows for up to 25 percent by weight based on the total amount of monomers to be a high boiling solvent, preferably from about 0 to about 15 percent by weight. The solvents have a boiling point above 100° C. and preferably above 150° C. The solvents disclosed include aromatic alcohols, aliphatic alcohols, alcohol and glycol ethers, esters and mixed ethers and esters. Other solvents disclosed are aromatic solvents such as toluene, xylene, cumene, and ethylbenzene; and glycols such as ethylene, propylene and butylene glycols and their polyether analogs. The preferred solvents are glymes and diglymes especially ethyleneglycol dimethyl ether and diethyleneglycol dimethyl ether.

U.S. Pat. No. 4,914,167 to Hambrecht et al. discloses a solvent-free high temperature process for the production of co- and terpolymers comprising (a) 50 to 99 percent by weight of one or more of the following: acrylic acid, methacrylic acid, crotonic acid, vinyllactic acid, vinylsulfonic acid and vinylphosphonic acid; (b) from 0.5 to 5 percent by weight of a comonomer which is copolymerizable with (a) including styrene, alpha-methylstyrene, esters of acrylic acid or methacrylic acid with monohydric or polyhydric alcohols, monoesters and diesters of maleic acid with $C_1$–$C_{10}$ alkanols, alpha-olefins, allyl alcohol, vinyl acetate, n-butyl acrylate, 2-ethylhexyl acrylate, hydroxypropyl acrylate, styrene, N-vinylpyrrolidone and vinyl butyl ether; and (c) from 0 to 49 percent by weight of a comonomer selected from maleic anhydride, maleic acid, fumaric acid and itaconic acid. The resulting polymers have a K-value of from 18 to 33 as a 2 percent solution in DMF, according to DIN 53,726. As a comparative example, acrylic acid was polymerized as an aqueous solution at 100° C. resulting in a polymer solution having a K-value of 40 measured on a 1 percent solution in water.

European Patent Application EP 0,412,389 discloses a high temperature bulk copolymerization for the production of leather treatment copolymers. The copolymerizations are conducted in the absence of solvent at temperatures of from 80° to 300° C. and disclosed molecular weights are from 500 to 20,000. The comonomers are used in approximately equimolar amounts and are selected from (a) $C_8$–$C_{40}$ monoolefins and (b) ethylenically unsaturated $C_4$–$C_6$ dicarboxylic anhydrides.

It is an object of the present invention to provide high temperature aqueous processes for the production of low molecular weight carboxylic acid polymers.

It is a further object of the present invention to provide high temperature aqueous processes which do not require the use of organic solvent, or efficient chain transfer agents as a means of controlling the molecular weight of the resulting polymers.

Another object of this invention is to provide high temperature aqueous processes which result in polycarboxylic acids having number average molecular weights below 10,000.

Another object of this invention is to provide an aqueous polymer mixture of polycarboxylic acids having number average molecular weights below 10,000 and a polydispersity below 2.5.

Another object of this invention is to provide a polymer mixture having a sufficiently low polydispersity that residual monomer levels can be reduced without raising the polydispersity of the product to an unacceptable level.

Other objects of this invention will be apparent to those skilled in the art in light of the present disclosure and appended claims.

SUMMARY OF THE INVENTION

The present invention provides high temperature aqueous processes for the production of low molecular weight polycarboxylic acids. More specifically, the present invention provides an aqueous process for polymerizing carboxylic acid monomers by (a) forming a reaction mixture by feeding into a reactor containing water at a temperature in the range of from 130° to 240° C. under elevated pressure
  (i) one or more carboxylic acid monomers or aqueous solutions thereof, and
  (ii) initiator, or an aqueous solution thereof, in an effective amount for initiating free-radical polymerization of said monomers,
such that water always makes up at least 35 percent by weight of the reaction mixture; and (b) maintaining the reaction mixture in said temperature range to form a polymer product.

DETAILED DESCRIPTION OF THE INVENTION

The present invention provides high-temperature aqueous processes for polymerizing carboxylic acid monomers. The processes can be run as batch, semi-continuous or continuous processes. The processes require at least 35 percent by weight of the reaction mixture to be water and are conducted at from about 130° C. to about 240° C. The processes produce polymer products having low molecular weight, narrow polydispersity, and low salt content.

One class of carboxylic acid monomers suitable for the present invention are $C_3$–$C_6$ monoethylenically unsaturated monocarboxylic acids, and the alkali metal and ammonium salts thereof. The $C_3$–$C_6$ monoethylenically unsaturated monocarboxylic acids include acrylic acid (AA), methacrylic acid, crotonic acid, vinylacetic acid, and acryloxypropionic acid. Acrylic acid and methacrylic acid are the preferred monoethylenically unsaturated monocarboxylic acid monomers.

Another class of carboxylic acid monomers suitable for the present invention are $C_4$–$C_6$ monoethylenically unsaturated dicarboxylic acids and the alkali metal and ammonium salts thereof, and the anhydrides of the cis-dicarboxylic acids. Suitable examples include maleic acid, maleic anhydride, itaconic acid, mesaconic acid, fumaric acid and citraconic acid. Maleic anhydride and itaconic acid are preferred monoethylenically unsaturated dicarboxylic acid monomers.

The acid monomers useful in this invention may be in their acid forms or in the form of the alkali metal or ammonium salts of the acid. Suitable bases useful for neutralizing the monomer acids include sodium hydroxide, ammonium hydroxide, and potassium hydroxide. The acid monomers may be neutralized to a level of from 0 to 50 percent and preferably from 0 to about 20 percent. Most preferably, the carboxylic acid monomers are used in the unneutralized form. Partial neutralization of the carboxylic acid monomers alleviates corrosion on parts of the reaction equipment, but conversion of the monomers into polymer product is diminished. The monomers may be neutralized prior to or during polymerization. The polymer products are often particularly useful in their partially or completely neutralized form.

In addition, up to 20 percent by weight of the total polymerizable monomers may be monoethylenically unsaturated carboxyl-free monomers. Suitable monoethylenically unsaturated carboxyl-free monomers must be copolymerizable with the carboxylic monomers. Typical monoethylenically unsaturated carboxyl-free monomers which are suitable for this invention include alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiarybutylacrylamide, N-methylacrylamide, N,N-dimethylacrylamide; acrylonitrile, methacrylonitrile, allyl alcohol, allylsulfonic acid, allylphosphonic acid, vinylphosphonic acid, dimethylaminoethyl acrylate, dimethylaminoethyl methacrylate, phosphoethyl methacrylate, N-vinylpyrrolidone, N-vinylformamide, N-vinylimidazole, vinyl acetate, styrene, styrenesulfonic acid and its salts, vinylsulfonic acid and its salts, and 2-acrylamido-2-methylpropanesulfonic acid and its salts.

Suitable initiators for the processes of the present invention are any conventional free-radical initiators which have a half-life of at least 1 second at the polymerization temperature. Preferably, the initiator will have a half life of from about 1 second to about 2 hours, most preferably from about 10 seconds to about 45 minutes at the reaction temperature. These high-temperature initiators include, but are not limited to, oxygen hydrogen peroxide, certain alkyl hydroperoxides, dialkyl peroxides, peresters, percarbonates, ketone peroxides and azo initiators. Specific examples of some suitable initiators include hydrogen peroxide, t-butyl hydroperoxide, di-tertiary butyl peroxide, tertiary-amyl hydroperoxide and methylethyl ketone peroxide. The initiators are normally used in amounts of from about 0.05 percent to about 25 percent based on the weight of total polymerizable monomer. A preferred range is from about 0.5 to about 20 percent by weight of the total polymerizable monomer.

Water-soluble redox initiators may also be used. These initiators include, but are not limited to, sodium bisulfite, sodium sulfite, isoascorbic acid, sodium formaldehyde-sulfoxylate and the like, used with suitable oxidizing agents, such as the thermal initiators noted above. If used, the redox initiators may be used in amounts of 0.05 percent to 8 percent, based on the weight of total monomer. A preferred range is from about 0.5 to about 5 percent by weight of total monomer. Many of these initiators introduce salt by-products into the polymer product. It is preferred that the level of these initiators, when used, is minimized.

The monomers are polymerized as aqueous solutions. The reaction mixture must contain from at least 35 to about 95 percent by weight water as the solvent, preferably from at least 40 to about 80 percent by weight water, and most preferably from at least 40 to about weight water as the solvent, preferably from at least 40 to about 60 percent by weight water. As the percent by weight water in the reaction mixture decreases, particularly below 35 percent, the polydispersity (D) of the resulting polymer mixture increases. This is likely due to chain-chain coupling and branching due to the high level of in-process solids. By maintaining at least 35 percent by weight of the reaction mixture as water, these problems are alleviated. At water levels above 95 percent by weight of the reaction mixture, polymerization becomes impractical. The water which makes up from 35 to 95 percent by weight of the reaction mixture may be introduced into the reaction mixture initially, as a separate feed, or as the solvent for one or more of the other components of the reaction mixture.

The temperature of the polymerization may range from about 130° C. to about 240° C., preferably from about 140° C. to about 230° C., and most preferably from about 150° C. to about 220° C. At temperatures below about 130° C. the molecular weight of the polymer increases. At temperatures above about 240° C., conversion of the monomer into polymer decreases and undesirable by-products are formed. Frequently, these by-products discolor the polymer mixture and may necessitate a purification step to remove them.

Since water is used as the reaction solvent, the elevated temperatures of the polymerization require that the polymerization reactor be equipped to operate at elevated pressure. In general, it is preferred to conduct the polymerization at from about 25 to about 2,000 pounds per square inch (psi), and more preferably at from about 50 to about 1,000 psi.

The process of the present invention is effective in producing low molecular weight polymers without resorting to other techniques previously known. If desired, however, those techniques can be incorporated into the process of the present invention; e.g. use of chain transfer agents, metal ions or chain stopping agents. These techniques may be practiced in conjunction with the high temperature aqueous process of the present invention but they are not necessary to obtain low molecular weight polymers.

In another embodiment of the present invention, the process can be used to polymerize the one or more carboxylic acid monomers in the presence of a reactive substrate. A reactive substrate is a compound which, under the conditions of the reaction, may undergo a grafting or esterification reaction with the polymerizing monomers. This is accomplished by including in the reaction mixture, either as a heel charge or as a separate feed, a suitable reactive substrate.

Compounds which are suitable reactive substrates are those which are water-soluble and contain hydrogen atoms which can be abstracted by a free-radical. Examples of suitable reactive substrates include: polyhydric alcohols such as sugars, glycerol, polysaccharides, and poly(vinyl alcohol); poly(ethylene glycol); poly(propylene glycol); and certain esters such as polycaprolactone. Preferably, the graft substrate is poly(ethylene glycol) (PEG), sorbitol, sucrose, glucose, or other mono-, oligo-or polysaccharide.

When a reactive substrate is used in conjunction with the process of the present invention, the reactive substrate can be present at a level of up to about 50 percent by weight of the reaction mixture. Preferably, the reactive substrate, when used, is present at a level of from about 10 to about 30 percent by weight of the reaction mixture. The reactive substrate can be introduced into the reaction mixture as a heel charge, as a feed or both.

The process of the present invention generally results in good conversion of the monomers into polymer product. However, particularly in continuous processes, there are always some residual monomers. If residual monomer levels in the polymer mixture are unacceptably high for a particular application, their levels can be reduced by any of several techniques.

One common method for reducing the level of residual monomer in a polymer mixture is post-polymerization addition of one or more initiators or reducing agents which can assist scavenging of unreacted monomer. In a batch process, the residual monomer levels can be reduced by such an addition in the polymerization reactor or in one or more downstream reactors. In a continuous process, the post-polymerization addition is performed by discharging the contents of the reactor into one or more downstream reactors and adding one or more initiators or reducing agents to the polymer mixture. Downstream reactors suitable for conducting a post-polymerization addition of one or more initiators or reducing agents as a means of reducing the residual monomer content of the polymer mixture include batch tank reactors and plug-flow reactors, pipe reactors, scraped-wall reactors, or other continuous reactors, and combinations thereof.

Preferably, any post-polymerization additions of initiators or reducing agents are conducted in one or more downstream reactors which are maintained at or below the temperature of the polymerization reactor. The initiators and reducing agents suitable for reducing the residual monomer content of polymer mixtures are well known to those skilled in the art. The choice of the particular initiator or reducing agent will depend upon the temperature at which they are employed, and the amount of time they are in contact with the polymer mixture at a particular temperature. Generally, any of the initiators suitable for the polymerization are also suitable for reducing the residual monomer content of the polymer mixture. When the post-polymerization addition of initiators or reducing agents is done at a temperature which is lower than that of the polymerization, low-temperature initiators, such as persulfates, may also be used. The post-polymerization addition of initiators or reducing agents is generally done at a temperature in the range of from 80° C. to the temperature at which the polymerization was conducted, preferably in the range of from about 80° to about 180° C., and most preferably in the range of from about 90° to about 140° C.

The level of initiators or reducing agents added as a means for reducing the residual monomer content of the polymer mixture should be as low as possible to minimize contamination of the product. Generally, the level of initiator or reducing agent added to reduce the residual monomer content of the polymer mixture is in the range of from about 0.1 to about 2.0, and preferably from about 0.5 to about 1.0 mole percent based on the total amount of polymerizable monomer.

Post-polymerization addition of one or more initiators or reducing agents to the polymer mixture generally increases both the molecular weight and the polydispersity of the polymer product. Because the process of the present invention results in polymer mixtures having low polydispersity, the increases in polydispersity resulting from post-polymerization addition of initiators or reducing agents does not significantly detract from the performance characteristics of the polymer mixture.

The process of the present invention results in polycarboxylic acids having low molecular weights and narrow polydispersities. Furthermore, the process results in products which do not require the removal of organic solvents and are not contaminated with high levels of salt. The process of the present invention can be used to produce polycarboxylic acids having number average molecular weights below 10,000, preferably from 500 to 8,000 and most preferably from 600 to 5,000. The polydispersities of the polymer products are below about 2.5, and preferably below about 2.0.

In one embodiment of the present invention, the reactions are conducted as a continuous process. A continuous process may be conducted in a continuous stirred tank reactor (CSTR). The use of a CSTR permits continuous addition of reactants and continuous removal of products. Decreased operating costs are one advantage to using CSTRs. Generally, the CSTR is initially filled with water and, optionally, some of the graft substrate or a small amount of monomer. The contents of the CSTR are then heated to the desired temperature, and the feeds are begun. Preferably, the one or more monomers, the initiator, and the graft substrate, if used, are each fed as separate streams. The rate of addition of the feeds should equal the rate at which product is removed from the CSTR so that a constant volume is maintained in the reactor. Preferably, the reactor is operated at, or near the maximum volume to enhance the economy of the process, and to minimize the head space volumes in which vapor phase polymerization can occur. The rate of addition of the feeds should be adjusted to provide an average residence time of at least about 2 minutes. Preferably, the feeds are adjusted to provide a residence time of from about 3 minutes to about 180 minutes, and most preferably from about 5 to about 60 minutes.

The molecular weights referred to are measured by gel permeation chromatography using a polyacrylic acid standard unless specifically stated otherwise.

EXAMPLE 1A

A 115 ml CSTR equipped with a temperature probe, stirrer, heating jacket, outlet port and inlet ports for monomer(s) and initiator solutions was filled to capacity with deionized water. The stirrer was turned on and the water was heated to 200° C. A monomer solution of 20 percent by weight acrylic acid in deionized water, and an initiator solution of 2.0 percent by weight hydrogen peroxide (30 percent) in deionized water, were each pumped simultaneously to the CSTR at rates of 5.0 ml/min through their respective inlet ports. At the same time these feeds were started, the outlet port was opened to discharge contents of the CSTR at a rate of 10.0 ml/min thereby maintaining the level in the CSTR at capacity and providing a residence time of 10 minutes. At equilibrium, the amount of acrylic acid, either as monomer or polymer, was 10 percent and is reported as % solids in Table 1 below.

EXAMPLE 1B

The procedure of Example 1A was followed except the monomer solution was 40 percent by weight acrylic acid in deionized water, and the initiator solution was 4.0 percent by weight hydrogen peroxide (30 percent) in deionized water. At equilibrium, the amount of acrylic acid, either as monomer or polymer, was 20 percent and is reported as % solids in Table 1 below.

EXAMPLE 1C

The procedure of Example 1A was followed except the monomer solution was glacial acrylic acid fed at 6 ml/minute and the initiator solution was 15 percent by weight hydrogen peroxide (30 percent) in deionized water fed at 4 ml/minute. At equilibrium, the amount of acrylic acid, either as monomer or polymer, was 60 percent and is reported as % solids in Table 1 below.

EXAMPLE 1D

The procedure of Example 1A was followed except the monomer solution was 78 percent by weight glacial acrylic acid, 20 percent by weight maleic anhydride, 0.6 percent by weight hydrogen peroxide and 1.4 percent by weight deionized water. This solution was fed at 4 ml/minute. The initiator solution was 25 percent by weight sodium persulfate in deionized water fed at 2.5 ml/minute. At equilibrium, the amount of acrylic acid and maleic anhydride, either as monomer or polymer, was 70 percent and is reported as % solids in Table 1 below.

TABLE 1

| Example | % Solids | $M_w$ | $M_n$ | D |
|---|---|---|---|---|
| 1A | 10 | 2,130 | 1830 | 1.16 |
| 1B | 20 | 2,560 | 2170 | 1.18 |
| 1C | 60 | 9,750 | 3920 | 2.49 |
| 1D | 70 | 11,800 | 850 | 13.88 |

As can be seen from the data in Table 1, there is an increase in the $M_w$, $M_n$ and polydispersity (D) of the polymer mixture produced at high solids levels, particularly at 70 percent solids.

EXAMPLE 2A

The procedure of Example 1A was followed except the initiator solution also contained 20 percent by weight poly(ethylene glycol) having $M_w$ 600. At equilibrium, the amount of acrylic acid in the reaction mixture, either as monomer or polymer, was 10 percent and the amount of poly(ethylene glycol) in the reaction mixture was 10 percent. This is reported as 20% solids in Table 2 below.

EXAMPLE 2B

The procedure of Example 1B was followed except the initiator solution also contained 40 percent by weight poly(ethylene glycol) having $M_w$ 600. At equilibrium, the amount of acrylic acid in the reaction mixture, either as monomer or polymer, was 20 percent and the amount of poly(ethylene glycol) in the reaction mixture was 20 percent. This is reported as 40% solids in Table 2 below.

EXAMPLE 2C

The procedure of Example 1A was followed except the monomer solution was 60 percent by weight acrylic acid in deionized water, and the initiator solution was 6 percent by weight hydrogen peroxide (30 percent) in deionized water and also contained 60 percent by weight poly(ethylene glycol) having $M_w$ 600. At equilibrium, the amount of acrylic acid in the reaction mixture, either as monomer or polymer, was 30 percent and the amount of poly(ethylene glycol) in the reaction mixture was 30 percent. This is reported as 60% solids in Table 2 below.

TABLE 2

| Example | % Solids | $M_w$ | $M_n$ | D |
|---|---|---|---|---|
| 2A | 20 | 1870 | 1570 | 1.19 |
| 2B | 40 | 1900 | 1590 | 1.19 |
| 2C | 60 | 2070 | 1670 | 1.23 |

The data in Table 2 show that even with the presence of a reactive substrate, poly(ethylene glycol), the $M_n$ of the resulting polymer mixture was kept fairly constant. Again, $M_w$ and D increased as the level of solids increased.

EXAMPLE 3A

A 155 ml CSTR equipped with a temperature probe, stirrer, heating jacket, outlet port and inlet ports for monomer(s) and initiator solutions was filled to capacity with deionized water. The stirrer was turned on and the water was heated to 215° C. Deionized water was pumped through the monomer inlet port at a rate of 15 ml/min and through the initiator port at a rate of 5 ml/min. The outlet port was opened to discharge contents of the CSTR at a rate of 20 ml/min thereby maintaining the level in the CSTR at capacity. The water being pumped into the CSTR was then replaced by a monomer solution of 30 percent by weight acrylic acid, and 13 percent by weight sorbitol in deionized water, and an initiator solution of 6.2 percent by weight tertiary butyl hydroperoxide (tBHP) and 0.9 percent by weight mercaptoacetic acid in deionized water, which were pumped simultaneously to the CSTR at rates of 15 ml/min and 5 ml/min respectively. The results appear in Table 3 below.

EXAMPLE 3B

The same procedure as Example 3A was followed except that the monomer feed was 54 percent by weight acrylic acid in deionized water fed at 5 ml/min, the initiator feed was 3.8 percent by weight tBHP and 9.7 percent by weight starch in deionized water fed at 5 ml/min, and the reaction temperature was 205° C. The results appear in Table 3 below.

EXAMPLE 3C

The same procedure as Example 3A was followed except that the sorbitol was replaced with sucrose, no mercaptoacetic acid was used, and the reaction temperature was 200° C. The results appear in Table 3 below.

TABLE 3

| Example | Substrate | $M_w$ | $M_n$ | D |
|---|---|---|---|---|
| 3A | Sorbitol | 3350 | 2480 | 1.35 |
| 3B | Starch | 3160 | 2560 | 1.23 |

TABLE 3-continued

| Example | Substrate | $M_w$ | $M_n$ | D |
|---|---|---|---|---|
| 3C | Sucrose | 4080 | 3190 | 1.28 |

The data appearing in Table 3 show the process of the present invention using various reactive substrates. As noted above, $M_n$, $M_w$, and D of the resulting polymer mixture remain fairly constant even in the presence of the reactive substrates.

EXAMPLE 4A

A 155 ml CSTR equipped with a temperature probe, stirrer, heating jacket, outlet port and inlet ports for monomer(s) and initiator solutions was filled to capacity with deionized water. The stirrer was turned on and the water was heated to 160° C. Deionized water was pumped through the monomer inlet port at a rate of 3.1 ml/min and through the initiator port at a rate of 2.9 ml/min. The outlet port was opened to discharge contents of the CSTR at a rate of 6.0 ml/min thereby maintaining the level in the CSTR at capacity. The water being pumped into the CSTR was then replaced by a monomer solution of 72 percent by weight acrylic acid in deionized water, and an initiator solution of 2 percent by weight hydrogen peroxide (30 percent) in deionized water, which were pumped simultaneously to the CSTR at rates of 3.1 ml/min and 2.9 ml/min respectively.

Examples 4B through 4I were conducted in a similar manner as Example 4A with changes in reaction temperature and initiator level as noted below. Examples 4D and 4E used an initiator solution of 4 percent by weight hydrogen peroxide (30 percent) in deionized water. Example 4F was conducted in a similar manner as Example 4A except that the monomer solution was 33 percent by weight maleic anhydride in deionized water fed at 10 grams/min. and the initiator solution was 33 percent by weight t-BHP fed at 5 ml/min. Example 4G was conducted in a similar manner as Example 4A except that the monomer solution was 33 percent by weight methacrylic acid in deionized water fed at 8 grams/min. and the initiator solution was 4.8 percent by weight t-BHP fed at 4 ml/min. Examples 4H and 4I were conducted in a similar manner as Example 4A except that the monomer solutions were 33 percent by weight maleic anhydride in deionized water fed at 8 grams/min. and the initiator solution was 26 percent by weight initiator fed at 4 ml/min. Example 4J was conducted in a similar manner as Example 4A except that the monomer solution was 43 percent by weight acrylic acid in deionized water fed at 7 grams/min. and the initiator solution was 4.3 percent by weight $H_2O_2$ and 23.5 percent by weight maleic anhydride fed at 7 ml/min.

TABLE 4

| Example | Temp. (°C.) | Initiator Type | Level | $M_2$ | $M_n$ | D |
|---|---|---|---|---|---|---|
| 4A | 160 | $H_2O_2$ | 2% | 8220 | 4280 | 1.92 |
| 4B | 190 | $H_2O_2$ | 2% | 6547 | 3520 | 1.86 |
| 4C | 220 | $H_2O_2$ | 2% | 4250 | 2770 | 1.53 |
| 4D | 160 | $H_2O_2$ | 4% | 4010 | 3070 | 1.31 |
| 4E | 220 | $H_2O_2$ | 4% | 2840 | 2380 | 1.19 |
| 4F | 220 | tBHP | 33% | 493 | 447 | 1.10 |
| 4G | 210 | tBHP | 5% | 12800 | 6830 | 1.89 |
| 4H | 200 | tBHP | 26% | 555 | 483 | 1.15 |
| 4I | 185 | $H_2O_2$ | 26% | 536 | 471 | 1.14 |

TABLE 4-continued

| Example | Temp. (°C.) | Initiator Type | Level | $M_2$ | $M_n$ | D |
|---|---|---|---|---|---|---|
| 4J | 185 | $H_2O_2$ | 4% | 4090 | 1920 | 2.13 |

The data appearing in Table 4 show the increase in the $M_w$ and $M_n$ of the polymer product as the temperature decreases. The data also show the process of the present invention for other acid monomers, and for the production of copolymers.

In an alternative embodiment of the present invention, the polymerization can be conducted in a batch reactor.

EXAMPLE 5A

A 3-liter Fluitron brand pressure reactor equipped with inlet ports for monomer and initiator, a thermometer, a pressure gauge, a rupture disc, a stirrer, heating coils, and a heating jacket was initially charged with 700 grams of PEG ($M_w$ 3400) and 500 grams of deionized water. The contents of the reactor were stirred and the reactor was inerted with nitrogen. A vacuum was applied to the reactor until the pressure was 20–25 inches Hg. The reactor contents were then heated to 150° C. Two feeds were prepared: a monomer feed of 300 grams glacial acrylic acid and 200 grams deionized water; and an initiator feed of 81 grams of 70 percent by weight t-BHP and 289 grams of deionized water. These feeds were fed linearly and separately into the stirring, heated reactor over two hours. After the feeds were completed, 10 grams of deionized water were fed through each of the feed lines as a wash. The reactor contents were held for an additional 30 minutes at 150° C. and then cooled to 60° C. The data appear in Table 5 below.

EXAMPLE 5B

The procedure of Example 5A was followed except that 32.25 grams of 70 percent by weight t-BHP solution was used. The data appear in Table 5 below.

EXAMPLE 5C

The procedure of Example 5A was followed except that 48.64 grams of 70 percent by weight t-BHP solution was used. The data appear in Table 5 below.

EXAMPLE 5D

The procedure of Example 5C was followed except that the polymerization was conducted at 160° C. The data appear in Table 5 below.

EXAMPLE 5E

The procedure of Example 5A was followed except that the initial charge was 500 grams of PEG ($M_w$ 3400) and 700 grams of deionized water; the monomer feed was 500 grams of glacial acrylic acid; and the initiator feed was 135 grams of 70 percent by weight t-BHP. The data appear in Table 5 below.

EXAMPLE 5F

The procedure of Example 5A was followed except that the initial charge was 300 grams of PEG ($M_w$ 3400) and 900 grams of deionized water; the monomer feed was 700 grams of glacial acrylic acid; and the initiator feed was 189 grams of 70 percent by weight t-BHP. The data appear in Table 5 below.

EXAMPLE 5G

The procedure of Example 5A was followed except that the initial charge was 1,200 grams of deionized water and no PEG. The data appear in Table 5 below.

EXAMPLE 5H

The procedure of Example 5A was followed except that the monomer feed was eliminated. The data appear in Table 5 below.

EXAMPLE 5I

The procedure of Example 5A was followed except that the initiator feed was 71.4 grams of 30 percent by weight $H_2O_2$. The data appear in Table 5 below.

TABLE 5

| Example | Wt. Ratio AA/PEG | $M_w$ | $M_n$ | D |
|---|---|---|---|---|
| 5A | 30/70 | 2350 | 1560 | 1.51 |
| 5B | 30/70 | 2000 | 1170 | 1.71 |
| 5C | 30/70 | 1410 | 1090 | 1.29 |
| 5D | 30/70 | 1450 | 1070 | 1.35 |
| 5E | 50/50 | 2710 | 2030 | 1.33 |
| 5F | 70/30 | 885 | 705 | 1.25 |
| 5G | 100/0 | 1650 | 1140 | 1.45 |
| 5H | 0/100 | 343 | 235 | 1.46 |
| 5I | 30/70 | 1900 | 1290 | 1.47 |

The data appearing in Table 5 shows the usefulness of the process of the present invention when conducted as a batch process. Furthermore, the high temperature aqueous batch process is also useful for reacting the carboxylic acid monomer with a reactive substrate.

EXAMPLE 6A

The same procedure of Example 5G was followed except the initiator feed was 71.4 grams of 30 percent by weight $H_2O_2$. The data appear in Table 6 below.

EXAMPLE 6B

The same procedure of Example 5G was followed except the initial charge was 926 grams of deionized water; the monomer feed was 600 grams of glacial acrylic acid; and the initiator feed was 142.8 grams of 30 percent by weight $H_2O_2$. The data appear in Table 6 below.

EXAMPLE 6C

The same procedure of Example 5G was followed except the initial charge was 810 grams of deionized water; the monomer feed was 1,200 grams of glacial acrylic acid; and the initiator feed was 285.6 grams of 30 percent by weight $H_2O_2$. The data appear in Table 6 below.

TABLE 6

| Example | Solids (%) | $M_w$ | $M_n$ | D |
|---|---|---|---|---|
| 6A | 15 | 3240 | 2810 | 1.15 |
| 6B | 33 | 5330 | 3510 | 1.52 |
| 6C | 50 | 17600 | 5390 | 3.27 |

The data appearing in Table 6 also show the effect of solids on the polydispersity of the resulting polymer mixture made by a batch process. As the amount of water in the process is reduced, the polydispersity tends to increase.

EXAMPLE 7A

A 155 ml CSTR equipped with a temperature probe, stirrer, heating jacket, outlet port and inlet ports for monomer(s) and initiator solutions was filled to capacity with deionized water. The stirrer was turned on and the water was heated to 215° C. Deionized water was pumped through the monomer inlet port at a rate of 2.7 g/min and through the initiator port at a rate of 3.3 ml/min. The outlet port was opened to discharge contents of the CSTR at a rate of 6.0 ml/min thereby maintaining the level in the CSTR at capacity. The water being pumped into the CSTR was then replaced by a monomer solution of 75 percent by weight acrylic acid in deionized water, and an initiator solution of 7 percent by weight hydrogen peroxide (30 percent) and 42.5 percent by weight PEG having $M_w$ of 3400 in deionized water, which were pumped simultaneously to the CSTR at rates of 3.1 ml/min and 2.9 ml/min respectively. The contents of the CSTR were continuously discharged into a 40 ml static mixer maintained at 215° C. The contents of the static mixer were discharged into an unheated static mixer where a solution of 2 percent by weight sodium persulfate was added at a rate of 1.6 g/min and the mixture cooled to about 40° C. This mixture was then discharged into a 40 ml static mixer maintained at 120° C. The data appears in Table 7 below.

EXAMPLE 7B

The procedure of Example 7A was followed except: the monomer feed was fed at 3.2 ml/min; the initiator feed was 2.7 percent by weight hydrogen peroxide in deionized water (no PEG was used) fed at 2.8 ml/min; the temperature of the reactor and the first static mixer was 220° C. The data appears in Table 7 below.

EXAMPLE 7C

A 155 ml CSTR equipped with a temperature probe, stirrer, heating jacket, outlet port and inlet ports for monomer(s) and initiator solutions was filled to capacity with deionized water. The stirrer was turned on and the water was heated to 205° C. Deionized water was pumped through the monomer inlet port and the initiator port at a rate of 5 ml/min. The outlet port was opened to discharge contents of the CSTR at a rate of 10 ml/min thereby maintaining the level in the CSTR at capacity. The water being pumped into the CSTR was then replaced by a monomer solution of 45.4 percent by weight acrylic acid and 13.6 percent by weight sorbitol in deionized water, and an initiator solution of 2.2 percent by weight t-BHP and 31.8 percent by sorbitol in deionized water, which were each pumped simultaneously to the CSTR at a rate of 5 ml/min. The contents of the CSTR were continuously discharged into a second CSTR maintained at 95° C. to which a 12 percent by weight solution of sodium persulfate was continually added at a rate of 1 g/min. The data appears in Table 7 below.

TABLE 7

| | Reactor | | | | Final | | | |
|---|---|---|---|---|---|---|---|---|
| Ex. | Residual Monomer (ppm) | $M_w$ | $M_n$ | D | Residual Monomer (ppm) | $M_w$ | $M_n$ | D |
| 7A | 12,759 | 2380 | 1890 | 1.26 | 106 | 2960 | 1960 | 1.51 |
| 7B | 14,731 | 2640 | 2130 | 1.24 | 3,075 | 2840 | 2380 | 1.19 |

TABLE 7-continued

| | Reactor | | | | Final | | | |
|---|---|---|---|---|---|---|---|---|
| Ex. | Residual Monomer (ppm) | $M_w$ | $M_n$ | D | Residual Monomer (ppm) | $M_w$ | $M_n$ | D |
| 7C | 6,667 | 2830 | 2370 | 1.19 | 45 | 4540 | 3120 | 1.45 |

The data appearing in Table 7 show the results of the process of the present invention before and after a post-polymerization addition of initiator. The narrow molecular weight distribution of the polymer product is maintained after the polymer mixture is subjected to a post-polymerization addition of initiator.

We claim:

1. An aqueous process for polymerizing carboxylic acid monomers comprising:
   (a) forming a reaction mixture by feeding into a reactor containing water at a temperature in the range of from about 130° to about 240° C. under elevated pressure
      (i) one or more carboxylic acid monomers or aqueous solutions thereof selected from the group consisting of $C_3$–$C_6$ monoethylenically unsaturated monocarboxylic acids, $C_4$–$C_6$ monoethylenically unsaturated dicarboxylic acids, anhydrides of $C_4$–$C_6$ monoethylenically unsaturated cis-dicarboxylic acids and the and ammonium salts thereof,
      (ii) initiator, or an aqueous solution thereof, in an effective amount for initiating free-radical polymerization of said monomers, and
      (iii) one or more monoethylenically unsaturated carboxyl-free monomers, or aqueous solutions thereof, at a level of from 0 to 20 percent by weight based on the total carboxylic acid monomers,
   such that water always makes up at least 35 percent by weight of the reaction mixture and wherein the reaction mixture is substantially free of metal ions and substantially free of organic solvent; and wherein substantially all carboxylic acid monomers used are fed into the reactor containing water at a temperature in the range of from about 130° to about 240° C., and
   (b) maintaining the reaction mixture in said temperature range to form a polymer product having $M_n$ below 10,000.

2. The process of claim 1 wherein the one or more carboxylic acid monomers are selected from the group consisting of acrylic acid, methacrylic acid, maleic acid, maleic anhydride, itaconic acid, crotonic acid, and fumaric acid.

3. The process of claim 2 wherein the one or more carboxylic acid monomers are selected from the group consisting of acrylic acid, methacrylic acid, maleic acid and maleic anhydride.

4. The process of claim 3 wherein the one or more carboxylic acid monomers are selected from the group consisting of acrylic acid and methacrylic acid.

5. The process of claim 1 wherein the one or more carboxylic acid monomers are at least partially neutralized.

6. The process of claim 1 wherein the initiator is selected from the group consisting of hydrogen peroxide, t-butyl hydroperoxide, and di-tertiary butyl peroxide.

7. The process of claim 1 wherein the temperature range is from about 140° to about 230° C.

8. The process of claim 1 wherein the temperature range is from about 150° to about 220° C.

9. The process of claim 1 wherein the polymer product has $M_n$ below 10,000 and a polydispersity below 2.5.

10. The process of claim 1 wherein the polymer product has $M_n$ from 500 to 8,000 and a polydispersity below 2.5.

11. The process of claim 1 wherein the polymer product has $M_n$ from 600 to 5,000 and a polydispersity below 2.5.

12. The process of claim 1 wherein the monoethylenically unsaturated carboxyl-free monomers are selected from the group consisting of $C_1$–$C_4$ alkyl esters of acrylic acid, $C_1$–$C_4$ alkyl esters of methacrylic acid, hydroxyalkyl esters of acrylic acid, hydroxyalkyl esters of methacrylic acid, acrylamide, methacrylamide, N-tertiarybutylacrylamide, N-methylacrylamide, N,N-dimethylacrylamide, acrylonitrile, methacrylonitrile, allyl alcohol, allylsulfonic acid, allylphosphonic acid, vinylphosphonic acid, dimethylaminoethyl acrylate, dimethylaminoethyl methacrylate, phosphoethyl methacrylate, N-vinylpyrrolidone, N-vinylformamide, N-vinylimidazole, vinyl acetate, styrene, styrenesulfonic acid, vinylsulfonic acid, and 2-acrylamido-2-methylpropanesulfonic acid.

13. The process of claim 1 wherein the process is a continuous process.

14. The process of claim 13 wherein a residence time of from about 2 to about 45 minutes is provided.

15. An aqueous process for polymerizing carboxylic acid monomers comprising:
   (a) forming a reaction mixture by feeding into a reactor containing water at a temperature in the range of from about 130° to about 240° C. under elevated pressure
      (i) one or more carboxylic acid monomers or aqueous solutions thereof selected from the group consisting of $C_3$–$C_6$ monoethylenically unsaturated monocarboxylic acids, $C_4$–$C_6$ monoethylenically unsaturated dicarboxylic acids, anhydrides of $C_4$–$C_6$ monoethylenically unsaturated cis-dicarboxylic acids and the ammonium salts thereof, and
      (ii) initiator, or an aqueous solution thereof, in an effective amount for initiating free-radical polymerization of said monomers,
   such that water always makes up at least 35 percent by weight of the reaction mixture and wherein the reaction mixture is substantially free of metal ions and substantially free of chain transfer agent; and wherein substantially all carboxylic acid monomers used are fed into the reactor containing water at a temperature in the range of from about 130° to about 240° C., and
   (b) maintaining the reaction mixture in said temperature range to form a polymer product having $M_n$ below 10,000.

* * * * *